US007779169B2

(12) United States Patent
Revah et al.

(10) Patent No.: US 7,779,169 B2
(45) Date of Patent: Aug. 17, 2010

(54) SYSTEM AND METHOD FOR MIRRORING DATA

(75) Inventors: Yaron Revah, Tel-Aviv (IL); Shemer Schwartz, Herzelia (IL); Efri Zeidner, Kirynt Mozkin (IL); Ofir Zohar, Alfe-Menashe (IL)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 11/485,739

(22) Filed: Jul. 13, 2006

(65) Prior Publication Data

US 2006/0253624 A1 Nov. 9, 2006

Related U.S. Application Data

(63) Continuation-in-part of application No. 10/620,080, filed on Jul. 15, 2003, and a continuation-in-part of application No. 10/701,800, filed on Nov. 5, 2003, and a continuation-in-part of application No. 11/123,993, filed on May 6, 2005, now Pat. No. 7,552,309.

(60) Provisional application No. 60/774,611, filed on Feb. 21, 2006.

(51) Int. Cl.
*G06F 12/00* (2006.01)
(52) U.S. Cl. .................... 710/12; 710/17; 710/18; 710/38; 710/72; 710/74
(58) Field of Classification Search ............. 709/213, 709/217; 714/5, 6, 7; 707/200, 204; 711/112, 711/113, 114, 162, 170
See application file for complete search history.

(56) References Cited

U.S. PATENT DOCUMENTS

| | | | | |
|---|---|---|---|---|
| 5,889,935 A * | 3/1999 | Ofek et al. | ............ | 714/6 |
| 6,044,444 A * | 3/2000 | Ofek | ............ | 711/162 |
| 6,112,257 A * | 8/2000 | Mason et al. | ............ | 710/18 |
| 6,173,377 B1 * | 1/2001 | Yanai et al. | ............ | 711/162 |
| 6,442,706 B1 * | 8/2002 | Wahl et al. | ............ | 714/6 |
| 6,530,003 B2 * | 3/2003 | Bakke et al. | ............ | 711/162 |
| 6,532,547 B1 * | 3/2003 | Wilcox | ............ | 714/5 |
| 6,611,896 B1 * | 8/2003 | Mason et al. | ............ | 711/114 |
| 6,691,245 B1 * | 2/2004 | DeKoning | ............ | 714/6 |
| 6,711,649 B1 * | 3/2004 | Bachmat et al. | ............ | 711/114 |
| 7,103,797 B1 * | 9/2006 | Wahl et al. | ............ | 714/6 |
| 7,139,885 B2 * | 11/2006 | Yamagami | ............ | 711/162 |
| 7,234,033 B2 * | 6/2007 | Watanabe | ............ | 711/162 |
| 7,240,238 B2 * | 7/2007 | Yanai et al. | ............ | 714/7 |
| 7,266,653 B2 * | 9/2007 | Tross et al. | ............ | 711/162 |
| 7,330,915 B2 * | 2/2008 | Glynn | ............ | 710/38 |
| 7,340,572 B2 * | 3/2008 | Cochran | ............ | 711/162 |
| 7,376,764 B1 * | 5/2008 | Todd | ............ | 710/38 |
| 7,380,088 B2 * | 5/2008 | Wang et al. | ............ | 711/170 |
| 7,383,313 B2 * | 6/2008 | Fujibayashi | ............ | 709/213 |
| 7,395,370 B2 * | 7/2008 | Ukai et al. | ............ | 711/114 |
| 7,529,781 B2 * | 5/2009 | Frey et al. | ............ | 1/1 |
| 7,596,672 B1 * | 9/2009 | Gole et al. | ............ | 711/170 |

(Continued)

*Primary Examiner*—Henry W. H. Tsai
*Assistant Examiner*—Cheng-Yuan Tseng
(74) *Attorney, Agent, or Firm*—Griffiths & Seaton PLLC (57) ABSTRACT

Disclosed is a method and system for preparing a mirror batch within a data processing system. Upon determining that a first open batch is approaching or has reached a completion criteria, a controller may cause system elements contributing data to the first open batch to cease acknowledging transaction requests while not ceasing to execute the transaction requests.

18 Claims, 3 Drawing Sheets

U.S. PATENT DOCUMENTS

2002/0032835 A1* 3/2002 Li et al. .................... 711/114
2005/0177693 A1* 8/2005 Nahum .................... 711/162
2007/0214313 A1* 9/2007 Kalos et al. ................ 711/114

* cited by examiner

SYSTEM AND METHOD FOR MIRRORING DATA

RELATED APPLICATIONS

The present application is a continuation in part from each of the below listed applications:
(1) "DATA ALLOCATION IN A DISTRIBUTED STORAGE SYSTEM", U.S. Utility application Ser. No. 10/620,080, filed on Jul. 15, 2003;
(2) "PARALLEL ASYNCHRONIZATIONRONOUS ORDER-PRESERVING TRANSACTION PROCESSING", U.S. Utility application Ser. No. 10/701,800, filed on Nov. 5, 2003;
(3) "DATA STORAGE METHODS FOR HIERARCHICAL COPIES," U.S. Utility application Ser. No. 11/123,993, Filed on May 6, 2005 now U.S. Pat. No. 7,552,309; and
(4) U.S. Provisional Application Ser. No. 60/774,611 field Feb. 21, 2006;

Each of which is hereby incorporated by reference in its entirety.

FIELD OF THE INVENTION

The present invention generally relates to the field of data storage. More specifically, the present invention relates to a system and method for backing up or mirroring data of a data storage system.

BACKGROUND OF THE INVENTION

The information age has enabled organizations to absorb, produce and analyze massive volumes of data. Nowadays, information in the form of digital data has become part of the core of many organizations' operations. Consequently, data is presently one of the most valuable assets of many organizations in a variety of fields, and in some cases is considered to be the key asset of the organization.

The events of Sep. 11, 2001 exposed the vulnerability of data systems and the precious data stored therein to disasters such as terrorist attacks and various unexpected natural occurrences which could cause massive damage and destruction to facilities housing data storage and processing systems. The survivability and recoverability of data systems following a terrorist attack or other disasters has thus become a major concern of organizations around the world. It has become a necessity for organizations which are reliant upon the data stored in their data systems to ensure the survivability and the recoverability of the organization's data, in a way that the organization can quickly and efficiently recover from any event resulting in massive damage to the organization's data systems.

In order to mitigate massive data loss due to damage or other malfunction at a primary data storage server or system, it is common to backup the primary data storage server or system of an organization. For a backup system to successfully avoid the same data loss due to some event at the primary server, the backup system may be distributed and geographically removed from the primary server to ensure that any event which may damage the primary server is not likely to also affect the integrity of the backup system.

It has been suggested to transmit the data stored in the primary storage system to a secondary storage system, commonly referred to as a mirror server or system. The primary storage system and the mirror storage system may be located at different geographical locations (i.e. remote from one another), such that any event resulting in physical damage or operational failure of the primary storage system is not likely to damage or cause the operational failure of the backup/mirror storage system. This backup technique is commonly dubbed remote mirroring.

Since data storage/processing systems are dynamic, such that new data is regularly written to and read from these systems, via write transactions and read transactions, backup or mirroring systems for these data storage and processing systems usually operate substantially in real-time. The use to substantially real-time data mirroring or backup systems is required to insure that as updated of a version as possible of the data stored in the primary server is backed up at the instant of a failure.

An important feature of the remote mirroring system is an "order-preserving" mechanism. An order-preserving mechanism insures that any two host-ordered transactions A,B (in the sense that B is not initiated until A is acknowledged) are processed in the system exactly in the order that the host initiated them, and that no situation may arise in which B may have been completed while A is not.

An example of an order-preserving mechanism and a non-order-preserving mechanism is illustrated hereinafter. Consider a system comprising a host connected to a storage system, where the latter processes requests sent by the former. Each request is "completed" when a response, or acknowledgement, is returned to the host. A non-order-preserving mechanism would be when the host sends a write request A to the system and then a write request B before A has been completed and acknowledged, this means the host does not establish a strict order with a clear demand that one of the two transactions should be completed first. The storage system can therefore treat those transactions accordingly, without having to follow a strict order relation between them. An order-preserving mechanism would be such that transaction B is not initiated by the host until A has been acknowledged.

One of the main reasons for introducing order-preserving mechanisms is that in case of damage or other malfunction, such a mechanism may prevent inconsistent situations arising in the system. In this way, the host may be able to consistently recover and restart the processes where they were interrupted.

A remote mirroring storage system may comprise local and remote storage elements (i.e. primary and secondary, master and slave etc.), where the remote acts as remote mirroring for data volumes of the local one. In such a system an order-preserving mechanism is necessary as a warranty that requests sent by the host in an ordered fashion will not lead to inconsistent situations in the secondary system in case of damage or malfunction.

The prior art contemplates two main approaches to remote mirroring, each of which handles the problem of "order-preservation" and consistency differently.

Synchronous approach—wherein the local system does not acknowledge a request before it has been sent, fully processed, and acknowledged by the remote system as well. Under synchronous approach, order-preserving is solved inherently. e.g. if write request B is received at the local only after A has been acknowledged by this device, then B will never be processed in the remote one before A was completed and acknowledged there, since, in the first place, A was not acknowledged in the local one before it was acknowledged in the remote. One disadvantage of the synchronous approach is the latency of the transaction at the primary device, as the later needs to wait until the transaction is sent to the secondary, and then processed and acknowledged by it. Still, the system can process several non-ordered requests in parallel and therefore the overall throughput is not generally affected. The synchronous approach to remote mirroring does not prevent the scalability of the system.

Asynchronous approach—wherein no response is expected from the secondary device before the primary device acknowledges the transaction or that the response is given by the local system before it transmits the transaction to the remote one. Asynchronous approaches were introduced in order to solve the latency in transaction problem, which is particularly critical when the remote system is physically distant. One disadvantage is that they don't inherently solve the "order-preserving" problem.

An example of an asynchronous mirroring methodology may be referred to as "individual remote transmission," according to which methodology a host writes to the local system, which system acknowledges the transaction once it has completed it, and at the same time places the transaction in a queue for transmission to the remote or secondary device. The transactions in the queue are processed individually: each transaction is completed in the remote system and acknowledged before the second transaction is initiated. This approach trivially solves the latency problem in the local system, and at the same time yields the required "order-preservation". Clearly if either the local system or the link would fail, whatever data situation is produced in the remote, it corresponds to the order originally established by the host. However, the approach has evident disadvantages: as there is no parallel processing of transactions in the remote device, the overall performance of the system is affected and no scalability exists for the system.

Another example of an asynchronous approach methodology is the "Point in Time Transmission". This approach is based on the principle that the system is able to reproduce the current state of the system or part of the system when it decides. For instance, at a given time $t_0$ the local system creates a copy of the current state of volume $V_0$. Creating such a copy consumes a certain amount of system resources, and the copy is ready at a later time, say, $t_1$. When the copy is ready, the local system starts transmitting the entire copy of volume $V_0$ to the remote storage element. This operation can either be completed or fail, only for the entire volume. Thus, it ensures a coherent image on the secondary device (the image that existed in volume $V_0$ at time $t_0$). This is the main virtue of the approach. In addition it allows parallel processing of requests and it is thus scalable. On the downside, the time lag between two successive, consistent pictures created at the remote may be relatively long, and thus the data lost in case of damage or malfunction, may be relatively large. The consistent picture preserved in the secondary device may be significantly different from the current one at the primary at the time of damage or malfunction.

Yet another example of an asynchronous approach methodology is the "Time-Stamped Transmission". As in the "Individual Remote Transmission" methodology, asynchronous approaches may turn to be non-scalable, since they may not process the remote transactions in a fully parallel way. In many such implementations, transactions already acknowledged by the primary device are "chunked" together and sent to be processed by the secondary device, thus limiting the total throughput in the secondary device. This limitation can be overcome by enlarging the size of the chunks (i.e. "Individual Remote Transmission"), but this has the effect of enlarging the time lag between chunks, which in a case of damage or malfunction leads to an increase in the amount of lost data. Another disadvantage is that in order to transmit "point in time copies", it is necessary to create these copies in the local system, which also consumes considerable amount of time and storage resources. A good compromise can be reached by assigning a timestamp to every transaction in the local system and transmitting the transactions, either individually or in chunks, to the remote system. At any rate, in the remote system, the transactions are processed in an order corresponding to the timestamps. Thus, in case of damage or malfunction in the remote machine or in one of the links, no inconsistency is created in the remote system.

Establishing a global timestamp, simultaneously used in all components of the system, involves a synchronization process that is initiated by a selected component and must be acknowledged by all other components. Such processes are naturally supported by operating systems such as Linux. They always involve, however, a broadcast operation and certain, non-zero response time. Thus, they can conveniently be used for administration and monitoring tasks such as creating log files. They cannot be used, however, as the basis of an order-preserving mechanism in which an absolute synchronization is a must.

Indeed, assume that a host sends a request A to the system via interface node IF1, and that once this request has been completed it sends a second request B via interface IF2. Assume that IF1 assigns a timestamp tA to the completion of transaction A and that IF2 assigns a timestamp tB to the initiation of transaction B. Now, if time synchronization between IF1 and IF2 were perfect, then the timestamps could be used within the storage system as an indication of priority in internal processing of transaction. However, at any point in time there always may exist a non-zero time-lag D between the time as measured in IF1 and in IF2. If T indicates the time actually elapsed in the host between receiving the acknowledgment for request A and the issuing of request B, and if T<D (which is certainly a possibility), then we would obtain a situation where tA>tB. If the system would look at timestamps as its criteria for two transactions being ordered, it would not see A and B as ordered, and inconsistency might arise in a situation of remote mirroring. In fact, the situation may be even worse, if the processing of B turns out to be completed before the processing of A has started.

Therefore, although several methodologies, systems and circuits for providing remote data server mirroring are known and have been implemented, enhancements and improvements to existing server mirroring solutions are needed.

SUMMARY OF THE INVENTION

There is provided in accordance with some embodiments of the present invention a system and method of managing a data storage backup or mirroring system. Various network elements, such as cache controllers, may associate and/or send each transaction they complete to an open batch of transactions, which batch of transactions may be transmitted to one or more remote mirror servers, at which one or more mirror servers, the transactions in the batch may be executed in the order they were associated with or sent to the batch.

According to further embodiments of the present invention, a system controller or management module may monitor the size of any open batch, and upon determining that an open batch is approaching a "completion criteria" (e.g. the batch size is at or above 80% of it's maximum size), the controller may transmit a first synchronization signal to all the system elements contributing data to the batch (e.g. cache controllers). Each system element, upon receiving the first synchronization signal, may acknowledge to the system controller the receipt of the first synchronization signal and may cease acknowledging new transaction requests from hosts/data-clients.

Upon receiving an acknowledgment of receipt of the first synchronization signal from all the system element contributing to the batch, the controller may: (1) cause the open batch to close, (2) cause a new batch to open, and (3) send a second synchronization signal to all the system elements contributing data to the batch, thereby causing all the network elements to restart acknowledging completed transaction requests and to send a copy of the completed transaction requests to the new batch.

Once the newly opened batch approaches its "completion criteria," the system controller may repeat the above described steps, starting with sending a first synchronization signal.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Throughout the specification and the claims the term "data loss", "loss of data" and the like shall be used to described any situation where data is rendered substantially inaccessible or unusable for any reason whatsoever, and as a result of any event, including but not limited to, the physical destruction of at least a portion of one or more storage devices and/or a critical malfunction of at least a portion of one or more storage devices.

When a primary server or system is first connected and configured to backup its data on a mirror server, all the data on the primary server being backed up may be transmitted to, and stored on, the mirror server, thereby producing a substantially identical copy of the data on the primary server. Sometimes, a mirror server may be dedicated to the backup of data from a single primary server, while at other times a single mirror server may store data from multiple primary servers and may even act as a primary server for data clients.

After the initial data copying or synchronization between a primary and a mirror server, data on the primary server is rarely static and may change with any data transaction such as a data write request from a data client. Thus, the primary server may transmit to a mirror server/system information relating to any transactions the primary server/system may engage in, which transaction may alter data on the primary server.

According to some embodiments of the present invention, a data storage server and/or system may include a primary data server, a primary mirror or backup server and a secondary mirror server. The primary data server may service data read and write requests from one or more data clients (hosts), may participate in a synchronous data mirroring connection with the primary mirror server and may participate in an asynchronous data mirroring connection with the secondary mirror server.

According to further embodiments of the present invention, the primary data server may participate in an asynchronous data mirroring connection with the primary mirror server and may participate in a synchronous data mirroring connection with the secondary mirror server. According to yet further embodiments of the present invention, the primary data server may participate in asynchronous connections with both the primary and secondary data servers, or it may participate in synchronous connections with both the primary and secondary data servers.

There is provided in accordance with some embodiments of the present invention a system and method of managing a data storage backup or mirroring system. Various network elements, such as cache controllers, may be associated and/or send each transaction they complete to an open batch of transactions, which batch of transactions may be transmitted to one or more remote mirror servers, at which one or more mirror servers, the transaction in the batch may be executed in the order they were associated with or sent to the batch.

Figure 1:
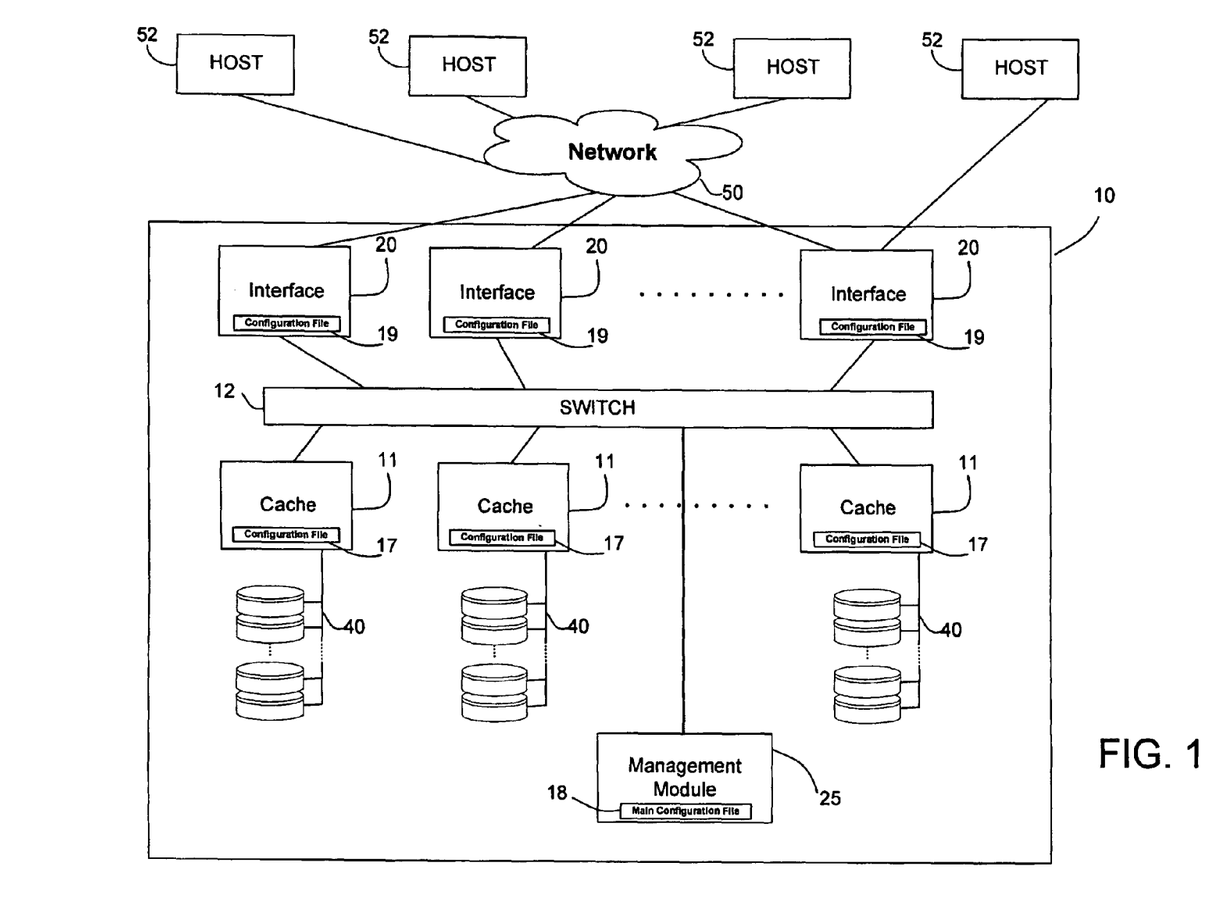
FIG. 1 is a block diagram showing an exemplary storage system.

Turning now to FIG. 1, which outlines a storage system. The exemplary storage system comprises interfaces 20, that allow communication between hosts and the system, caches 11, that act as fast volatile memory buffers, Disks 40, that store data in non-volatile media, and Management Module 25, that controls the overall activity in the system, including the configuration, definition and deletion of volumes, and monitoring the overall data activity in the system.

According to some embodiments of the present invention, element 11 (caches) may also operate as a disk controller.

Figure 2:
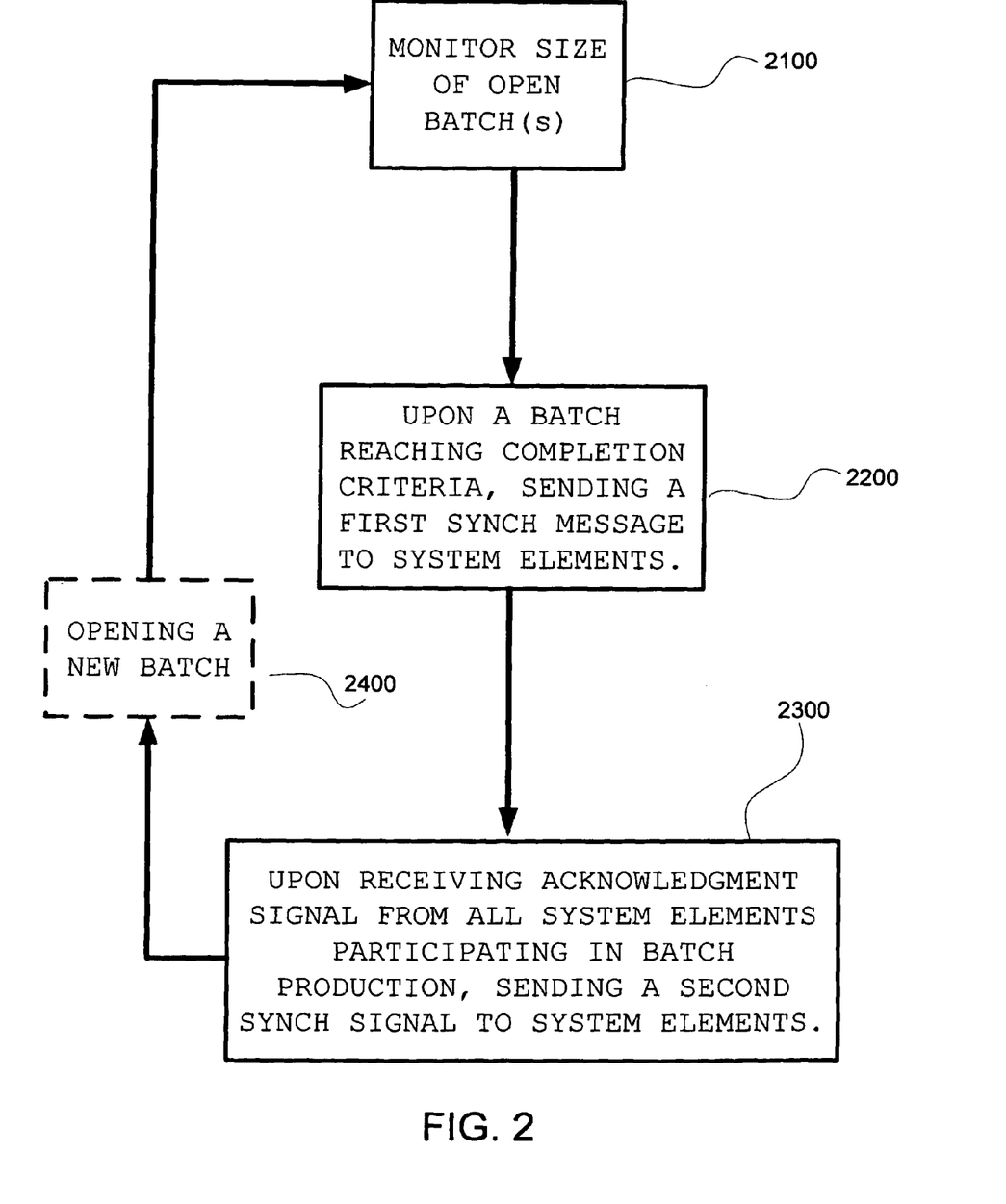
FIG. 2 is a flow chart depicting the steps of an embodiment of the present invention.

Turning now to FIG. 2 which is a flowchart of an embodiment of the present invention as seen from the viewpoint of the system's controller or management module. In accordance with further embodiments of the present invention, a system controller or management module may monitor the size of any open batch (step 2100), and upon determining that an open batch is approaching a completion criteria (e.g. the batch size is at or above 80% of it's maximum size), the controller may transmit a first synchronization signal to all the system elements contributing data to the batch (e.g. cache controllers), as depicted in step 2200. Each system element, upon receiving the first synchronization signal, may acknowledge to the system controller receipt of the first synchronization signal and may cease acknowledging new transaction requests from hosts/data-clients.

Referring now to step 2300, which shows that upon receiving an acknowledgment of receipt of the first synchronization signal from all the system elements contributing to the batch, the controller may: (1) cause the open batch to close, (2) cause a new batch to open (step 2400), and (3) send a second synchronization signal to all the system elements contributing data to the batch, thereby causing all the network elements to restart acknowledging completed transaction requests and to send a copy of the completed transaction requests to the new batch.

Once the newly opened batch approaches its completion criteria, the system controller may repeat the above described steps, starting with sending a first synchronization signal.

According to some embodiments of the present invention, each element in the system may comprise a clock. According to further embodiments, the clocks' value may be referred to as "remote transmission time." And according to yet further embodiments, a synchronization signal may be sent throughout the system, such that the synchronization signal may be used for incrementing the "remote transmission time" value.

Figure 3:
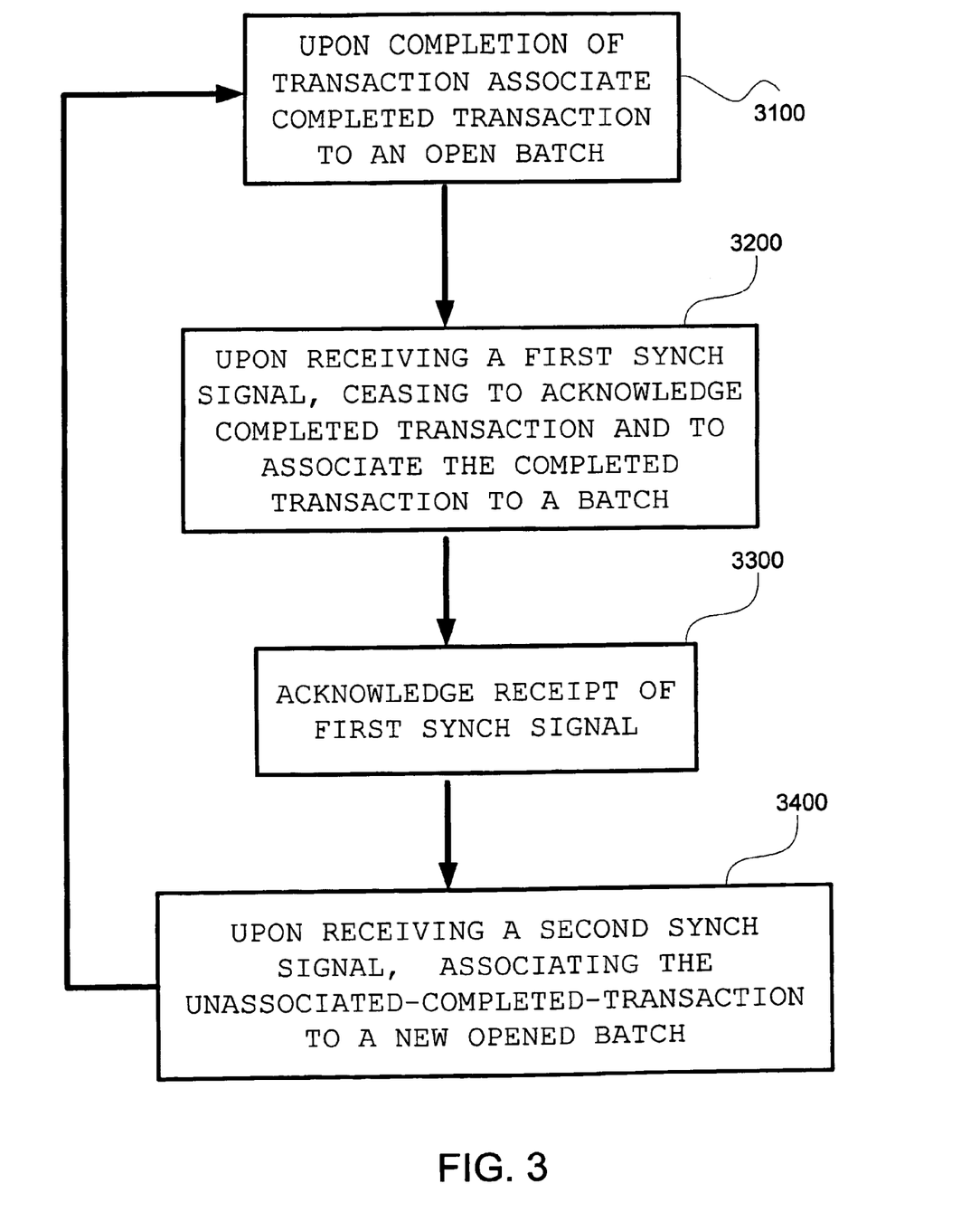
FIG. 3 is a flow chart depicting the steps of an embodiment of the present invention.

Turning now to FIG. 3, there is shown a flowchart depicting the steps of an embodiment of the present invention. Referring now to step 3100 where in Accordance with some embodiments of the present invention, after a transaction has been completed, the system element (e.g. cache controller) which handled the transaction may associate this transaction with a first open batch (e.g. send a copy of transaction related data to the first batch).

According to some embodiments of the present invention, the data storage system may include a management module or controller which may monitor the size of an open batch (e.g. how many transactions are associated with this batch) (step 2100).

According to some embodiments of the present invention, a "completion criteria" of the batch may be defined (e.g. the batch size is at 80% capacity). According to further embodiments of the present invention, the management module may detect whether a specific batch is approaching or has reached its "completion criteria."

According to some embodiments of the present invention, all the transactions that were completed before a "completion criteria" was met and share the same "remote transmission time" may be associated with the same batch.

According to some embodiments of the present invention, upon detection of a "completion criteria," the management module may send a first synchronization signal to all of the system elements.

Referring now to step 3200 where in accordance with some embodiments of the present invention, upon receiving a first synchronization signal, each of the system elements (e.g. cache controllers) may cease to associate newly completed transactions with the presently open batch and may send an acknowledge signal back to the management module.

According to some embodiments of the present invention, upon receiving a first synchronization signal, no newly completed transaction will be added to the first open batch, and the batch open at the time the first synchronization signal is received may be considered closed.

According to some embodiments of the present invention, a closed batch may be sent to a remote/mirror system without causing any inconsistencies between the remote and the local systems.

According to some embodiments of the present invention, upon receiving a first synchronization signal, the cache elements cease to acknowledge completed transactions and to associate the completed transactions with an open batch. Referring now to step 3300 where in accordance with yet further embodiments of the present invention, all of the system's elements send acknowledge signal back to the management module notifying it that they received the first synchronization signal.

According to some embodiments of the present invention, upon receiving acknowledge signal from all of the elements (i.e. all the elements that received the first synchronization signal), the management module may send a second synchronization signal to all of the system elements. The system management module may also cause the open batch to be closed and sent to a mirror system or server. The system management module may also cause a new batch to be opened.

Referring now to step 3400, where in accordance with some embodiments of the present invention, upon receiving a second synchronization signal, the cache elements may cause a new batch to open and may associate all the unassociated-completed-transactions with this new batch.

According to some embodiments of the present invention, upon receiving a second synchronization signal, the cache elements may restart acknowledging completed transactions and associating the completed transactions with the newly opened batch. According to yet further embodiments of the present invention, all of the system's elements may send an acknowledge signal back to the management module notifying it that they received the second synchronization signal.

According to some embodiments of the present invention, the completion criteria may be time-oriented. A time-oriented completion criteria is usually characterized by a pre-defined time interval, when the time-interval elapses the batch is closed, and upon the beginning of a new (consecutive) time interval a new batch, which is associated with the new time-interval, is created.

According to some further embodiments of the present invention, the completion criteria may be memory-oriented. A memory-oriented completion criteria is usually characterized by determining the amount of memory space devoted for storing the batch. When the batch fills the space devoted for its use, or a predefined threshold of that space (e.g. 80 percent of the space devoted for the batch is full), the batch is closed and sent. After the "old" batch was sent, the space is free and a "new batch" may inhabit it.

According to further embodiments of the present invention, the completion criteria may be a combination of the time-oriented approach and of the memory-oriented approach.

According to yet further embodiments of the present invention, it is possible to dynamically adjust the time-interval, if a time-oriented approach is taken, and/or adjust the amount of memory space devoted for storing the batch, if a memory-oriented approach is taken. The adjustment may be done in accordance with the maximal latency for individual operation, latency in a cache node or, in general, minimal latency, average latency over a period, average IO per second in the system, or any other similar measurement.

It should be understood by one of ordinary skill in the art that the various batch completion criteria and methods of calculating completion criteria described above are mere examples. Any completion criteria, and methods of calculating same, known today or to be devised in the future is applicable to present invention.

Exemplary Embodiment of the Present Invention

A precondition for the implementation of the invention here disclosed is the following: any two (or more) requests sent by the host to the local system and directed to handling a specific data block of a given volume will always be handled by the same cache within the distributed storage system. In other words: it is necessary that the system will be able to synchronize any two (or more) requests directed to the one and same portion of data, and the invention is meant to allow the synchronization of those requests that are handled within the system by different caches (or disk controllers). This precondition is easily fulfilled in a distributed mass data storage system by means of the data distribution scheme disclosed in U.S. patent application Ser. No. 10/620,080, entitled "DATA ALLOCATION IN A DISTRIBUTED STORAGE SYSTEM", filed on Jul. 15, 2003 by the assignees of the present invention.

The process of batch creation assumes that the system implements a synchronization mechanism for remote mirroring following any of the standard approaches known in the art. In order to describe the steps followed in creating the buffer, we may also assume that all modules in the system have been synchronized to "remote transmission time" t0, and that the host is now sending requests to the system. The process of batch creation (BC) comprises the following steps:

(BC1) Requests sent to the system by the host are served as usual, but at the same time they are associated with a first batch of requests, BA0, to be transmitted to the remote system. Associating a request or a transaction with a batch in the cache may mean that the request is stored in a certain buffer in the cache, and that some metadata is created in the cache to indicate this. Thus, for instance, let us assume that request A0 arrives after the system has been synchronized to time t0 and it is served by Cache 1. Assume that request A0 comprises writing data to blocks 150-200 of logical volume VN in the system. Cache 1 completes the request as usual and then in first data transmission buffer DTB0 (which is part of the memory space of the said cache) it stores the data associated with the blocks to be written, and at the same time in a command transmission buffer CTB0 it stores the command, indicating the operation to be performed, the relevant volume, and the relevant blocks.

(BC2) When a second request A1 reaches the system and is to be served by the same Cache 1 (at the same time other requests may be reaching other caches). Like before, request A1 is served and then it is also associated with batch B0, using buffers DTB0 and CTB0.

(BC3) This process continues in a similar way until, in one of the caches of the system, a "completion criteria" for the batch is reached. Thus for instance, the criteria may stipulate that the batch is to be closed when the buffer DTB0 of the said cache reaches a certain usage threshold stipulated in advance (for example 80% of the memory space allocated to the buffer has been already used to store blocks of commands that have been associated with the batch). At this point in time, the cache informs the management module that the "completion criteria" has been met.

(BC4) As the management module receives the completion message from one of the caches, it sends a synchronization message to all components, so that they will move their respective clocks from remote transmission time t0 to t0'. This message is broadcasted to all components in the system and they, in turn, send and acknowledgement message back to the manager.

(BC5) Once the manager has received all acknowledgment messages, it realizes that all components have moved their clocks to t0', and it immediately proceeds to send a new message indicating that the clock has to be moved from t0' to t1. Again, this message will be received and acknowledged by all components.

(BC6) In the time interval between t0' and t1, the various components of the system, and in particular the caches, will NOT acknowledge any request which was completed during the time interval between t0' and t1. e.g. even if the request was actually completed, the cache will wait until it receives the message for moving the clock to t1, and only then it will acknowledge any transaction completed between t0' and t1. The rationale for this is explained below.

(BC7) After a cache has received the message and has moved its transmission clock to t1, it returns to normal functioning, i.e. it acknowledges every transaction that it completes, and associates those transactions with a transmission batch. This time it is a second batch, BA1, defined by a second data transmission buffer DTB1 and a second command transmission buffer CTB1. The requests associated with this batch will comprise all requests received after t1, but also all requests received between t0' and t1. Notice that in this step, each cache has closed the first batch and opened the second one simultaneously, but two different caches may do this step at different global times. This lack of synchronization between the local time of the caches does not affect the global synchronization of the batch creation activity. Thus the batch BA0 that will be transmitted has been determined via the "completion criteria" (in this example, by the first cache in which the threshold was reached) and it is the aggregate of all data and commands that were stored in buffers DTB0 and CTB0 of all the caches taken together.

(BC8) While the system is continuing its normal functioning and creating a new batch BA1, the first batch may be transmitted from the local to the remote system. This transmission may be performed in several ways which are well known in the art and need not be explained here. The importance is that at some point in time the entire batch BA0 has reached the remote system and this remote system will begin to process it according to the criteria to be explained below.

(BC9) The remote system processes (locally, from its point of view) the data sent in batch BA0, and sends back an acknowledgement message to the local system for each transaction completed. Eventually, the local system realizes that the batch has been successfully transmitted and processed in its entirety. It proceeds to delete the contents of DTB0 and CTB0. The buffers are now free to receive a new batch and thus continue the process.

(BC10) The local system has continued the process of batch creation for the second transmission batch BA1, and this will continue to work out until the completion criteria for the batch is reached. At this point the process explained in steps (BC4-BC6) repeats itself thus moving the clocks to times t1', t2, t2', etc., and creating batches BA1, BA2, etc. A batch BA(N+1) is not sent until the acknowledgement of all transactions of BAN has been received in step (BC9) above. The batches are created alternatively in buffers DTB0,CTB0 and DTB1,CTB1 that are gradually used and freed, as the process continues.

The criteria for processing in the remote system the data associated with the successive batches is the following:

(CC-1) no command contained in batch BA(N+1) should be processed in the secondary device before ALL commands in batch BAN have been correctly processed and acknowledged by the secondary device.

(CC-2) within a given batch, the relative order of processing must be kept.

It is important to notice that several generalizations and modifications may be added to this basic implementation of the patent, including (but not limited to) the following ones:

(BC1') like (BC1), but it is not necessary to create two separate buffers DTBN and CTBN. One can create one buffer that comprises both the commands and the data associated with them. In fact, there are various alternative ways of defining the batches and those are well known in the art.

(BC3') like (BC3), but there may be various kinds of "completion criteria". For instance: different thresholds, a time criteria, a consideration of the current workload in the cache or in the machine at large, etc. Likewise, the management module may apply all kinds of criteria, separately or in combination, before it sends the synchronization message. For instance: it may wait until two caches send in their notifications. It may establish a minimal (or a maximal) time between synchronization, etc. This holds true also for (BC4).

(BC10') like (BC10) but instead of waiting for the first batch to be completed before starting to transmit the next batch, it is possible to start transmitting the second batch once it is closed at the local system. Notice that under (BC10), (CC-1) is intrinsically satisfied in the remote system, since no command of batch BA(N+1) is even transmitted (much less processed) before all commands in BA(N) have been acknowledged. (BC10') necessitates some additional mechanisms in the remote system, in order to make sure that (CC-1) is satisfied, but these mechanisms are well known in the art.

In addition, the following remark is necessary concerning (CC-2): There are at least two possible ways to create the batches in the local system, in relation to overlapping write requests (i.e., two write requests directed at the same LU that modify one or more blocks within that LU). [1] One way is to decide that no two requests contained in a batch may contain overlapping data. This condition necessitates, as part of batch creation, the implementation of a mechanism for identifying if a new request is overlapping an existing one, and to create a new request that merges the two overlapping ones. On the other hand, it may translate into a more efficient usage of the memory buffers devoted to batch creation. If this approach is followed, then condition (CC-2) is inherently fulfilled at the time of batch creation, by definition. [2] A second way is to allow that within a given batch, two or more requests containing overlapping blocks that are to be modified may be allowed. In this case, it is possible to ensure (CC-2) in several ways known in the art: for instance it is possible to demand that the order in the local system of two overlapping requests is preserved as part of batch transmission from the local to the remote system, and that in the remote they shall be processed accordingly (a timestamp may be used in order to enforce this approach.)

A further point to be noticed is the relative lengths of the times tn and tn'. The completion of a batch depends on several factors that the user can control. Thus for instance, if the completion criteria is as in (BC3), then the larger the memory buffer allocated, the longer the periods of time between batches. The time between tn' and tn+1, depends on the speed with which the system handles its messages. Thus there is room for maneuvering with the rhythm of batch creation and this can be used on behalf of a more efficient handling of the batches. It is even possible to control this, as stipulated in (BC3) in a dynamical way according to the performance parameters in the system.

It is easy to see now how this invention ensures the consistency of any set of data in the remote system, even in case of failure of any of the local storage systems or of the link between local and remote storage system. Indeed, let us consider two dependent write requests W1, W2 successively coming from the host to the local system, and then sent to the remote one. The invention must warranty that there can be no situation in which W2 is initiated in the remote without W1 having been completely processed. The situation involves two possible scenarios:

[A] W1 and W2 are directed to one same cache in the local system. In this case, the two requests are inherently ordered by the local cache in which they are handled and associated with a given batch (as explained above).

[B] W1 and W2 are directed at different portions of one same LU and not handled in the same cache. Let us assume that W1 is handled by Cache 1 and W2 by Cache 2. Let us also assume that W1 reached the cache and was associated with batch BA0 created after time t0 and before t0'. W2 entered the local system after W1 was completed. If W2 was completed before t0' then it is part of BA0 and it will be processed in the local after W1 (because of CC-2). If it was completed after t0' (and it does not matter if this happened before or after t1), then it will be acknowledged and transmitted with BA1, and then of course it will be processed in the remote after W2.

In order to complete the picture it is necessary to explain how data is handled in the remote system so as to avoid inconsistency due to double failure. Indeed, imagine that the local system sends a batch, and then it breaks down (or the link breaks down or is removed for some reason) before the batch was completely processed in the remote. It is possible that the image created in the remote is not consistent and thus of no use for recovery of the local system. In order to address this difficulty there are two possible approaches:

[1] Before the local system sends a batch, it sends a message to the remote indicating that it should create a snapshot of all LUs that are remote mirrors of LUs in the local system. Then, if the local system or the link fails before the batch has been completely transmitted, the remote may issue a "restore" command to all LUs of which snapshots were created so that the situation before the message was sent can be recreated.

This is obviously a consistent data situation in the remote that does not include any of the transactions meant to be completed as part of the batch that could not be fully transmitted. It should be pointed out, however, that snapshot creation for all LUs every time that a batch is about to be transmitted may seem too heavy a penalty to pay. This is not necessarily the case, however, as there are approaches to snapshot management that consume no computing resources or processing time at the time of creation. This is the case with the approach disclosed in U.S. patent application Ser. No. 11/123,993, entitled "DATA STORAGE METHODS FOR HIERARCHICAL COPIES", filed on May 6, 2005 by the assignees of the present invention. Indeed, this step of snapshot creation before transmission of the requests is a principle that can be usefully applied in the case of synchronous remote mirroring, as is explained below as part of a different aspect of the present disclosure.

[2] An alternative approach is to start processing the requests contained in a given batch, only when the entire batch has reached the remote system. In that case, even if the local system breaks down, the entire batch can be processed in the remote, thus attaining there a coherent image.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method for remote mirroring comprising a controller:
   creating a first mirror batch including a maximum size of data within a data processing system having a plurality of storage components;
   associating, transaction requests that are completed and acknowledged by the plurality of storage components with first mirror batch data;
   determining a completion criteria including a pre-determined percentage of the maximum size of the first mirror batch data is approaching or has been reached, causing the first mirror batch of the plurality of storage components to cease acknowledging completed transaction requests, while continuing to execute the transaction requests, wherein the determining comprises 1) the controller sending a first synchronization signal to the first mirror batch of the plurality of storage components and 2) receiving an acknowledgement signal indicating the pre-determined percentage is approaching or has been reached from the first mirror batch;
   closing the first mirror batch to a mirror server, and creating a second mirror batch from the plurality of storage components upon receipt of the acknowledgement signal form the first mirror batch; and
   sending a second synchronization signal that causes the second mirror batch to restart acknowledging completed transaction requests, and associating the second mirror batch with the completed transaction requests.

2. A system for remote mirroring comprising:
   a plurality of storage components; and
   a controller coupled to the plurality of storage components, the controller adapted for:
      creating a first mirror batch including a maximum size of data within a data processing system having the plurality of storage components,
      associating transaction requests that are completed and acknowledged by the plurality of storage components with first mirror batch data,
      determining a completion criteria including a pre-determined percentage of the maximum size of the first mirror batch data is approaching or has been reached, causing the first mirror batch of the plurality of storage components to cease acknowledging completed transaction requests, while continuing to execute the transaction requests, wherein the determining comprises 1) the controller sending a first synchronization signal to the first mirror batch of the plurality of storage components and 2) receiving an acknowledgement signal indicating the pre-determined percentage is approaching or has been reached from the first mirror batch,
      closing the first mirror batch to a mirror server, and creating a second mirror batch from the plurality of storage components upon receipt of the acknowledgement signal form the first mirror batch, and
      sending a second synchronization signal that causes the second mirror batch to restart acknowledging completed transaction requests, and associating the second mirror batch with the completed transaction requests.

3. A computer program product for remote mirroring using a processor device, the computer program product comprising a computer-readable storage medium having computer-readable program code portions stored therein, the computer-readable program code portions comprising:
   a first executable portion for creating a first mirror batch including a maximum size of data within a data processing system including a plurality of storage components;
   a second executable portion for associating transaction requests that are completed and acknowledged by the plurality of storage components with first mirror batch data;
   a third executable portion for determining a completion criteria including a pre-determined percentage of the maximum size of the first mirror batch data is approaching or has been reached, causing the first mirror batch of the plurality of storage components to cease acknowledging completed transaction requests, while continuing to execute the transaction requests, wherein the determining comprises 1) the controller sending a first synchronization signal to the first mirror batch of the plurality of storage components and 2) receiving an acknowledgement signal indicating the pre-determined percentage is approaching or has been reached from the first mirror batch;
   a fourth executable portion for closing the first mirror batch to a mirror server, and creating a second mirror batch from the plurality of storage components upon receipt of the acknowledgement signal form the first mirror batch; and
   a fifth executable portion for sending a second synchronization signal that causes the second mirror batch to restart acknowledging completed transaction requests, and associating the second mirror batch with the completed transaction requests.

4. The method according to claim 1, further comprising sending the closed batch to the mirror server.

5. The system according to claim 2, wherein said controller is further adapted to cause the closed batch to be sent to the mirror server.

6. The method according to claim 1, further comprising, following sending the second synchronization signal and determining that the pre-determined percentage of second mirror batch data is approaching or has been reached, repeating the sending the first synchronization signal to the first mirror batch.

7. The method according to claim 1, wherein determining that the pre-determined percentage is approaching or has been reached further comprises determining that the pre-determined percentage is approximately at or above eighty percent (80%) of the maximum size of the first mirror batch data.

8. The method according to claim 1, wherein sending the first synchronization signal includes using the first synchronization signal to increment a remote transmission time value.

9. The method according to claim 1, further comprising monitoring a size of the first mirror batch data at a point in time by comparing the size with the pre-determined percentage of the maximum size of the first mirror batch data.

10. The system according to claim 2, wherein the controller is further adapted for, following sending the second synchronization signal and determining that the pre-determined percentage of second mirror batch data is approaching or has been reached, repeating the sending the first synchronization signal to the first mirror batch.

11. The system according to claim 2, wherein the controller is further adapted for, pursuant to determining that the pre-determined percentage is approaching or has been reached, determining that the pre-determined percentage is approximately at or above eighty percent (80%) of the maximum size of the first mirror batch data.

12. The system according to claim 2, wherein the controller is further adapted for, pursuant to sending the first synchronization signal, using the first synchronization signal to increment a remote transmission time value.

13. The system according to claim 2, wherein the controller is further adapted for monitoring a size of the first mirror batch data at a point in time by comparing the size with the pre-determined percentage of the maximum size of the first mirror batch data.

14. The computer program product according to claim 3, further comprising a sixth executable portion for sending the closed batch to the mirror server.

15. The computer program product according to claim 3, further comprising a sixth executable portion for, following sending the second synchronization signal and determining that the pre-determined percentage of the second mirror batch is approaching or has been reached, repeating the sending the first synchronization signal to the first mirror batch.

16. The computer program product according to claim 3, further including a sixth executable portion for, pursuant to determining that the pre-determined percentage is approaching or has been reached, determining that the pre-determined percentage is approximately at or above eighty percent (80%) of the maximum size of the first mirror batch data.

17. The computer program product according to claim 3, further including a sixth executable portion for, pursuant to sending the first synchronization signal, using the first synchronization signal to increment a remote transmission time value.

18. The computer program product according to claim 3, further comprising a sixth executable portion for monitoring a size of the first mirror batch data at a point in time by comparing the size with the pre-determined percentage of the maximum size of the first mirror batch data.

\* \* \* \* \*